United States Patent
Park et al.

(10) Patent No.: US 9,720,472 B2
(45) Date of Patent: Aug. 1, 2017

(54) POWER SUPPLY DEVICE AND MICRO SERVER HAVING THE SAME

(71) Applicant: Samsung Electronics Co., Ltd., Suwon-si, Gyeonggi-do (KR)

(72) Inventors: Jeong-gyu Park, Yongin-si (KR); Hyung-suk Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 14/340,612

(22) Filed: Jul. 25, 2014

(65) Prior Publication Data
US 2015/0198987 A1 Jul. 16, 2015

(30) Foreign Application Priority Data
Jan. 10, 2014 (KR) .......................... 10-2014-0003220

(51) Int. Cl.
| | | |
|---|---|---|
| *G06F 1/00* | (2006.01) | |
| *G06F 11/00* | (2006.01) | |
| *B23K 11/24* | (2006.01) | |
| *F02P 3/02* | (2006.01) | |
| *G06F 1/26* | (2006.01) | |
| *H02M 3/156* | (2006.01) | |
| *G06F 11/20* | (2006.01) | |
| *G06F 1/32* | (2006.01) | |

(52) U.S. Cl.
CPC .............. *G06F 1/26* (2013.01); *G06F 1/3296* (2013.01); *H02M 3/156* (2013.01); *G06F 1/3206* (2013.01); *G06F 11/2015* (2013.01); *Y10T 307/406* (2015.04)

(58) Field of Classification Search
CPC ........ G06F 1/26; G06F 1/3296; G06F 1/3206; G06F 11/2015; H02M 3/156; Y10T 307/406
USPC ................... 713/300; 714/14; 323/318, 371
See application file for complete search history.

(56) References Cited

U.S. PATENT DOCUMENTS

| | | | |
|---|---|---|---|
| 7,176,661 B2 * | 2/2007 | Kranz | .................. H02M 3/158 323/222 |
| 7,694,163 B1 * | 4/2010 | Bisbee | ................... G06F 1/189 323/243 |
| 8,525,500 B1 * | 9/2013 | Martin | .................. H02M 3/156 323/283 |
| 2002/0089315 A1 | 7/2002 | Shi | |
| 2006/0209579 A1 * | 9/2006 | Duerbaum | .............. H02J 1/102 363/65 |
| 2007/0226524 A1 | 9/2007 | Nakamura | |
| 2009/0249089 A1 * | 10/2009 | Tremel | .................. G06F 1/3203 713/300 |
| 2009/0322304 A1 * | 12/2009 | Oraw | ...................... H02J 1/102 323/312 |
| 2010/0268969 A1 | 10/2010 | Rui | |

(Continued)

OTHER PUBLICATIONS

Extended European Search Report mailed May 18, 2015 issued in corresponding European Application No. 15150693.8-1959.

*Primary Examiner* — Ji H Bae
(74) *Attorney, Agent, or Firm* — Staas & Halsey LLP

(57) ABSTRACT

A power supply device includes a power supply configured to supply DC power, and a PMIC configured to convert DC power provided from the power supply and to provide the converted DC power to an SoC, wherein the PMIC is provided with a plurality of rails configured to output different voltages.

13 Claims, 10 Drawing Sheets

(56) References Cited

U.S. PATENT DOCUMENTS

2011/0258470  A1      10/2011  Ryoo
2012/0054503  A1 *    3/2012   Hsiao ................... G06F 1/3206
                                                                713/300
2015/0022272  A1 *    1/2015   Felix ........................ G06F 1/08
                                                                 331/17

* cited by examiner

US 9,720,472 B2

POWER SUPPLY DEVICE AND MICRO SERVER HAVING THE SAME

CROSS-REFERENCE TO RELATED APPLICATIONS

This application claims priority under 35 U.S.C. §119 from Korean Patent Application No. 10-2014-0003220 filed in the Korean Intellectual Property Office on Jan. 10, 2014, the disclosure of which is incorporated herein by reference in its entirety.

BACKGROUND OF THE INVENTION

1. Field of the Invention

Methods and apparatuses consistent with the exemplary embodiments relate to a power supply device and a micro server having the same, and more particularly, to a power supply device that is capable of supplying power to various CPUs, and a micro server having the same.

2. Description of the Related Art

Along with recent developments of high speed internet and intranet, there has been a need for a server technology that is capable of processing massive data at a high speed. Accordingly, a rack mount type cluster server technology emerged, but due to its large size and excessive power consumption, there was limitation in terms of system expansion since each server module needed to be connected by cable.

Accordingly, recently, micro servers that use processor modules are being used. A processor module refers to a thin and modularized enlarged server which is inserted and operated in a main body of a micro server system without accumulating rack servers transversely like a rack mount type server. It is called a high density server in a sense that a large number of servers may be inserted and installed in a small space. It is embedded with core elements of a server including one or more CPUs (Central Processing Units), a memory device, and an operating system, etc., and performs functions of the server with the support of power, input/output, subsidiary device and various control functions from a main body thereof.

Meanwhile, recent servers are sometimes configured by not just one type of a CPU but many types of CPUs, and low power cores, such as ARM and DSP, are sometimes applied together.

Meanwhile, a conventional server includes PMICs (Power Management Integrated Circuits) to provide an appropriate voltage to the CPU. Since a voltage rail and power capacity that the PMIC has depended on the type of a CPU in the convential server, the PMICs had to be designed differently for each CPU. Therefore, in order to apply a PMIC to a new server, there was inconvenience of having to design a PMIC for each CPU that it is applied to the corresponding server.

In addition, recent servers required bit power such as DDR, HDD, but in the conventional server, PMICs could output only a single fixed voltage, and thus there was a problem that it was impossible to output adaptive power to the server.

Furthermore, in order to control PMICs in the conventional server, interfaces among elements, for example, SoC, BMC, PMIC, and SoC, have to be connected each time, thereby making an IO interface among elements of SoC-PMIC-BMC more complicated, increasing the use of resources of the SoC and making efficient power designing difficult.

SUMMARY OF THE INVENTION

The present general inventive concept provides a power supply device that is capable of supplying power to various CPUs and a micro server having the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a power supply device including a power supply configured to supply DC power, and a PMIC configured to convert the DC power provided from the power supply and to provide the converted DC power to an SoC, wherein the PMIC is provided with a plurality of rails configured to output different voltages as the converted DC power.

The PMIC may include the plurality of pairs of rails configured to output the different voltages and to supply power to a plurality of SoCs at the same time.

Meanwhile, the plurality of rails may include a first rail to output a power of IV and 3 A, a second rail to output a power of 3.3V and 3 A, a third rail to output a power of 1.8V and 2 A, a fourth rail to output a power of 1.35V, and a fifth rail to output a power of 0.675V and 1 A.

Meanwhile, the PMIC may further include a voltage regulator module (VRM) to adjust a voltage of the power being output according to a core frequency and load size of the SoC.

Meanwhile, the rail may be an output of a synchronous buck.

Meanwhile, the PMIC may include a plurality of PWM generators configured to output a PWM signal for a switching operation of a switching device outside the PMIC, and a plurality of PWM signals being output from the plurality of PWM generators have a same phase.

Meanwhile, the PMIC may include a PWM generator configured to output a PWM signal for a switching operation of a switching device outside the PMIC, and the rail may be a combination of an output of a synchronous buck and an output of the switching device by the output PWM signal.

Meanwhile, the rail may reduce an output voltage to a predetermined size and may output the reduced output voltage when a size of a connected load is reduced.

Meanwhile, the SoC may be at least one of an Intel®-based CPU, ARM®-based CPU, and ARM type CPU.

Meanwhile, PMIC may transceive core information and IO state information with the SoC using $I^2C$.

Meanwhile, the PMIC may transceive core information and IO state information that it transceives with the SoC, with BMC.

The foregoing and/or other features and utilities of the present general inventive concept may also be achieved by providing a micro server including a plurality of SoC, a power supply to supply DC power, and a PMIC configured to convert the DC power provided from the power supply and to provide the converted DC power to the plurality of SoCs, wherein the PMIC is provided with a plurality of rails to output different voltages as the converted DC power.

In this case, the PMIC may include the plurality of pairs of rails configured to output the different voltages, and supplies the power to the plurality of SoCs at the same time.

Meanwhile, the PMIC may further include a voltage regulator module (VRM) to adjust a size of a voltage being output according to a core frequency and load size of the SoC.

Meanwhile, the PMIC may include a plurality of PWM generators to output a PWM signal for a switching operation of a switching device outside the PMIC, and a plurality of PWM signals being output from the plurality of PWM generators have a same phase.

Meanwhile, the PMIC may include a PWM generator configured to output a PWM signal for a switching operation of a switching device outside the PMIC, and the rail may be a combination of an output of a synchronous buck and an output of the switching device by the output PWM signal.

Meanwhile, the rail may reduce an output voltage by a predetermined size and output the reduced output voltage when a size of a connected load is reduced.

Meanwhile, the SoC may be at least one of an Intel®-based CPU, ARM®-based CPU, and ARM type CPU.

Meanwhile, the micro server may further include a module manager configured to notify a state of a micro server to an external manager server, and the PMIC may transceiver core information and IO state information to a module manager using I²C.

When at least one of the SoCs is replaced with a new SoC or when a new SoC is added as one of the SoCs, the PMIC supplies the power using the plurality of rails without replacing the PMIC or changing the rails.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
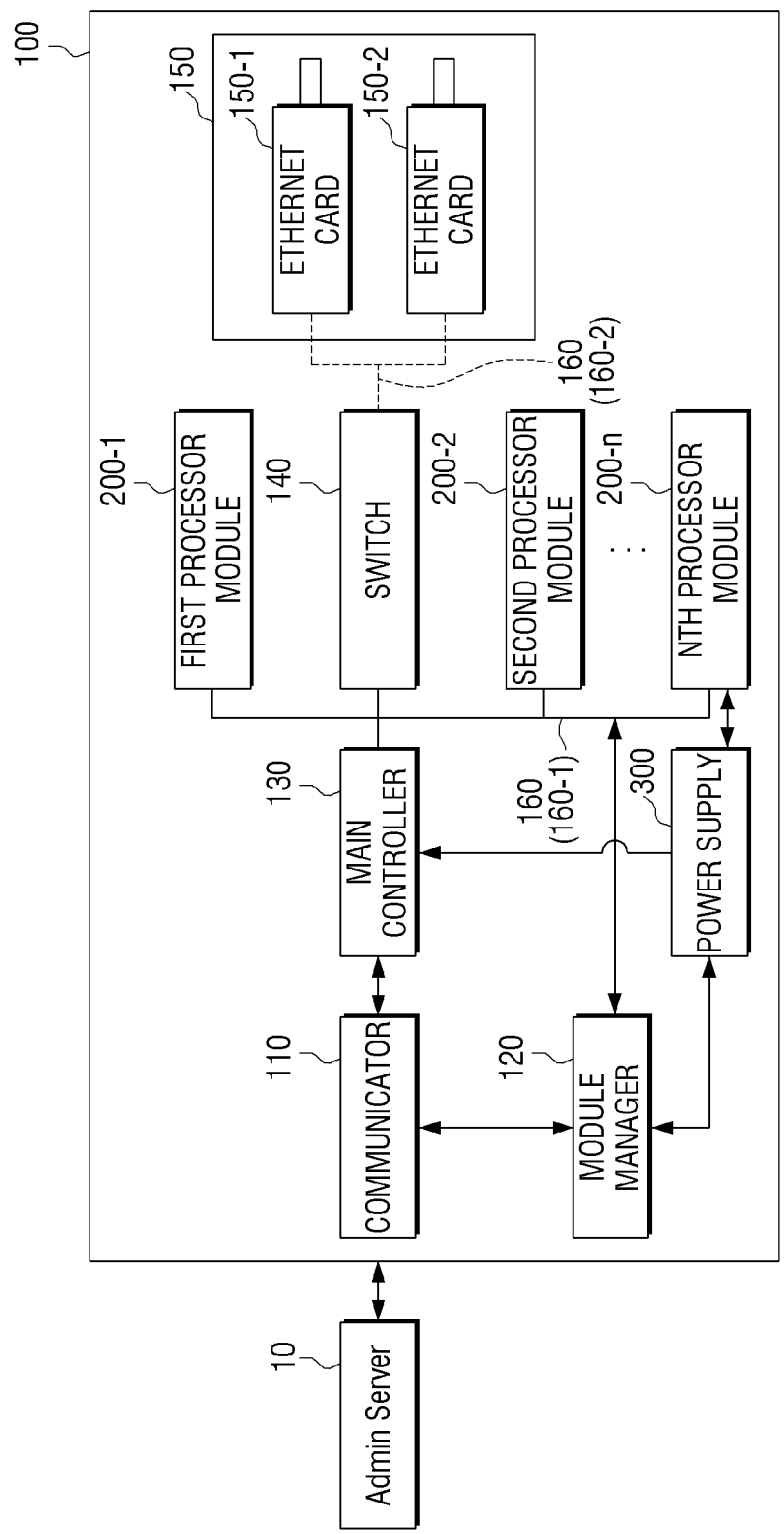
FIG. 1 is a block diagram illustrating a micro server according to an exemplary embodiment of the present general inventive concept.

Reference will now be made in detail to the embodiments of the present general inventive concept, examples of which are illustrated in the accompanying drawings, wherein like reference numerals refer to the like elements throughout.

The embodiments are described below in order to explain the present general inventive concept while referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a micro server 100 according to an exemplary embodiment of the present general inventive concept.

With reference to FIG. 1, the micro server 100 according to the present exemplary embodiment may include a communicator 110, a module manager 120, a main controller 130, a switch 140, an I/O device 150, a common interface bus 160 (160-1 and 160-2), a plurality of processor modules 200 (200-1, 200-2, . . . , 200-n), and a power supply device 300.

Meanwhile, the aforementioned communicator 110, module manager 120, switch 149, I/O device 150, and common interface bus 160 maybe formed on a based board or a base circuit board (not illustrated) of the micro server 100. The plurality of processor modules 200 (200-1, 200-2, . . . , 200-n) may be attached to and detached from a slot formed on the base board to be connected to elements (conmonents) of the micro server 100. Furthermore, the power supply device 300 may be attached to and detached from a slot formed on the base board to be connected to elements (components) of the micro server 100.

The communicator 110 performs communication with a management (administration) server 10. The communicator 110 may include a network controller and a LAN port, and the communicator 110 enables the module manager 120 to perform communication with the management server 10. Herein, the communicator 110 may perform communication with the management server 10 through a network channel for managing the server (OOB (Out of band)) separate from a network channel performing services (functions) of the micro server 100. Meanwhile, in the present exemplary embodiment, the communicator 110 is illustrated to perform communication with the management server 10 through a wired LAN port, but the present general inventive concept is not limited thereto. It is possible that other formats can be usable to perform communication with the management server 10, for example, a wireless communication method.

The module manager 120 is a baseboard management controller (BMC). Here, the BMC is a microprocessor mounted onto a server that provides a computer system interface, for example, an intelligent platform management interface (IPMI). It collects operational state information of the power supply device 300, state information of a plurality of processor modules (for example, a CPU type, CPU information such as the number of operational clocks, and whether or not it operates regarding processor modules, whether or not power is supplied, and a process occupation rate, etc.) and whether or not a fan operates to control a temperature of the micro server 100, and transmits the collected information to the management server 10 through the communicator 110. The management server 10 may be an external management server outside the micro server 100 such that the micro server 100 may perform operations thereof according to a control by the external management server 10.

Herein, the IPMI is an open type standard hardware management interface that defines specific methods by which an embedded management subordinate system can communicate. It performs monitoring, logging, recovery, inventory and hardware control regarding a processor module. Meanwhile, in the present exemplary embodiment, the module manager 120 collects state information of a plurality of processors in a lump sum and transmits the collected state information to the management server 10, but the present general inventive concept is not limited thereto. It is possible that each of the plurality of processor modules 200 (200-1, 200-2, . . . , 200-n) has a configuration corresponding to the module manager 120, and that each of the processor modules 200 (200-1, 200-2, . . . , 200-n) transmits the state information to the management server 10.

The main controller 130 controls each configuration of the micro server 100. The main controller 130 may control the switch 140 to transmit the data transmitted through the I/O device 150 to each of the processor modules 200 (200-1, 200-2, . . . , 200-n) using the common interface bus 160.

In addition, the main controller 130 controls each of the processor module 200 (200-1, 200-2, . . . , 200-n) mounted onto the micro server 100 so as to configure specified systems such as a web server, FTP server, main server, and database server, etc. For example, in a case of being used as a web server where numerous users access, the main controller 130 may control a processor module so that more processor modules may be used in the web page being accessed, or that a processor for web casing connected by the high speed Internet only can perform a corresponding processing.

The switch 140 may selectively connect the I/O device 150 and the plurality of processor modules 200 (200-1, 200-2, . . . , 200-n). The switch 140 enables such that the data received from the I/O device 150 can be selectively connected to one of the plurality of processor modules 200 and the data is transceived (transmitted and/or received) under the control of the main controller 130.

Furthermore, the switch 140 may be a PCI Express switch circuit (or MRA PCIe switch), and may selectively adjust a connection relationship between the plurality of processor modules 200 (200-1, 200-2, . . . , 200-n) and at least one I/O card of the I/O device.

Such a switch 140 may be embodied by the I/O virtualization technology. Herein, the I/O virtualization technology means the technology of using one I/O card in numerous processor modules at the same time.

The switch 140 may adjust a connection structure between the processor module 200 and the I/O device 150, and thus it is possible to adjust the connection structure of the processor module 200 without having to physically change a location of the processor module 200 and the I/O device 150.

The I/O device 150 may include at least one I/O card, and transceives data outside the micro server 100. Herein, the I/O card may be embodied as an Ethernet Card 150-1 or Fiber Channel Card 150-2.

In addition, the I/O device 150 may receive from or transmit data to an external device or external network. Herein, the data may be transceived to the processor module 200 through the PCI Express interface, and the connection with the processor module 200 may be controlled by the switch 140.

The common interface bus 160 is an access device to connect each configuration of the micro server 100. The common interface bus 160 may perform a bilateral communication or half-duplex communication according to the control of the main controller 130. Such a common interface bus 160 may include a first interface bus 160-1 to transmit a control command signal and a second interface bus 160-2 to transmit a data signal, for example.

Meanwhile, the common interface bus 160 may support at least one of an I$^2$C (or I2C) interface, a PCI Express interface, and an SMBUS interface. Accordingly, the first interface bus 160-1 that connects with the aforementioned control command signal may be an I$^2$C interface bus or an SMBus interface bus, and the second interface bus 160-2 that connects with the data signal may be a PCI Express interface bus. In addition, the communication between the aforementioned module manager 120 and the processor module 200 may be performed through the first interface bus 160-1 that supports I$^2$C or SMBus.

Herein, the I$^2$C (Inter-Integrated Circuit) interface is a bus standard developed for use in communication between a central processing unit and peripheral devices of a low speed. It is also called a two wire interface (TWI) since a line of two strands are used. The I$^2$C interface bus is a synchronous communication method, the interface bus consisting of a clock signal and data signal, enabling bilateral communication with a master device regardless of the number of slave devices. Furthermore, two or more master devices may be placed on one bus, and further slave devices may be added or removed even when the I$^2$C interface operates. Accordingly, the aforementioned main controller and module manager may operate as a master device, and the aforementioned plurality of processor modules 200 may operate as slave devices.

And, the PCI Express (Peripheral Component Interconnect Express) interface is a local bus standard that maintains software compatibility with a parallel interface bus, and that has an improved serial structure for a high speed input/output between devices. The PCI express interface is appropriate for processing massive data. In this regard, in the present exemplary embodiment, according to the control by the main controller 130, data is transmitted to each processor module 200 through the PCI Express interface bus of the common interface bus 160-2.

In addition, the SMBus (System management Bus) interface is a simple 2-line bus used for communicating with low speed devices in a mother board. It is an interface that transmits a clock, data, and command, and that is based on I$^2$C serial bus protocol.

The data received from the I/O device 150 may be transmitted to the processor module 200 selected in the switch 140 through the PCI Express interface. Herein, the switch 140 may select the processor module 200 to transmit the data under the control by the main controller 130.

The processor module 200 is a module configured to be embedded with one or more core elements of a server, such as one CPU, a memory device, and an operating system, etc., and to perform functions of a server with the support of power, input/output, subsidiary device, and various control functions.

In addition, the processor module 200 is connected to the main controller 130 through the common interface bus 150. The processor module 200 may include a module controller configured to relay connection between the common interface bus 160 and an interface that the CPU mounted on the processor module 200 uses.

Furthermore, the processor module 200 is connected to the module manager 120 through the common interface bus 160.

The power supply device 300 supplies power to each configuration in the micro server 100. The power supply device 300 is provided with a plurality of power supplies so as to have an excessive power capacity in addition to a maximum power capacity required in the micro server 100. And the power supply device 300 may supply power to a system on chip (SoC) using a power management integrated circuit (PMIC). Corresponding configurations and operations of the power supply device 300 will be explained hereinbelow in more detail with reference to FIG. 2.

As aforementioned, the micro server 100 according to the present exemplary embodiment uses the power supply device 300 that is designed to supply a power size more than a maximum power size required in the micro server 100, and thus even when one of the power supplies inside the power supply device 300 breaks down, the power supply device 300 may operate to supply the necessary power with stability. In addition, the micro server 100 may supply power to the SoC using a PMIC, and thus even when operating in a different type of a CPU, it is possible to apply the PMIC without change of design on the power supply device 300 and/or the Soc. In addition, the micro server 100 may supply power to a plurality of SoCs using one PMIC, thereby reducing a size area of the power supply device 300.

FIG. 1 illustrates that the micro server 100 has only three processor modules, but the present general inventive concept is not limited thereto. It may have only two processor modules, or only four or more processor modules.

In addition, FIG. 1 illustrates that the communicator 110 and module manager 120 are embodied separately from each other, the functions of the module manager 120 and the functions of the communicator 110 may be embodied in one configuration.

Figure 2:
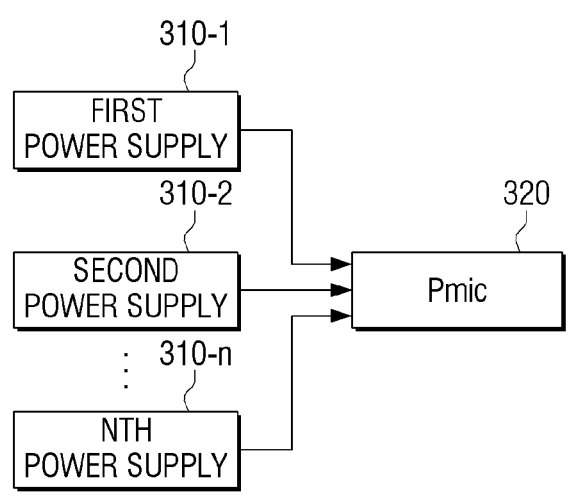
FIG. 2 is a block diagram illustrating a power supply device of the micro server of FIG. 1.

FIG. 2 is a block diagram illustrating the power supply device 300 of FIG. 1 according to an embodiment of the present general inventive concept.

With reference to FIG. 2, the power supply device 300 includes a plurality of power supplies 310 (310-1, 310-2, . . . , 310-*n*) and a PMIC 320. The power supply device 300 may include a plurality of power supplies to provide a stable power supply even when one power supply breaks down. Furthermore, the number of power supplies included in the power supply device 300 may change according to a capacity of the power supply, but the power supply device 300 may have more power supplies than the number of power supplies to satisfy a maximum load capacity required in the micro server 100. For example, the micro server 100 that requires a maximum of 10 kW power may have three power supplies that may generate 5 kw of power, for example.

The plurality of power supplies 310-1, 310-2, 310-*n* may output DC power of a predetermined size in a current sharing method. Herein, the current sharing method is a method where a current necessary in a system is shared by each power supply by 1/n (here, n is the number of power supplies) and is output. For example, if a current amount corresponding to a load size of the micro server 100 is 9 A, for example, and the power supply device 300 includes three power supplies, each power supply may output a current amount of 3 A. The current sharing method is classified into a passive current sharing method and an active current sharing method. It is possible that power supplies for server use may be provided according to the current sharing method. It is also possible that a master/slave method current sharing method can be usable among the active current driving methods.

The PMIC 320 transforms the DC power being output from the plurality of power supplies 310-1, 310-2, 310-*n* and outputs the transformed DC power to an SoC of the processor module 200. Such a PMCI 320 is provided with a plurality of rails to output different powers, for example, different voltages. A connection relationship and configurations of the PMCI 320 will be explained in further detail hereinbelow with reference to FIGS. 3 to 6.

As such, the power supply device according to the present exemplary embodiment 300 is designed to provide power supplies excessively than a size of a maximum power required by the micro server 100, and thus it is possible to supply power stably even when one power supply breaks down. In addition, the power supply device 300 may be provided with a general use PMIC, and thus it is possible to supply power with stability regardless of the CPU type of the micro server 100.

Meanwhile, FIG. 2 illustrates that the power supply device according to the present exemplary embodiment 300 is applied to the micro server 100 only. However, the present general inventive concept is not limited thereto. It may be applied to any electronic device besides the server if only it is an electronic device that needs a PMIC.

Figure 3:
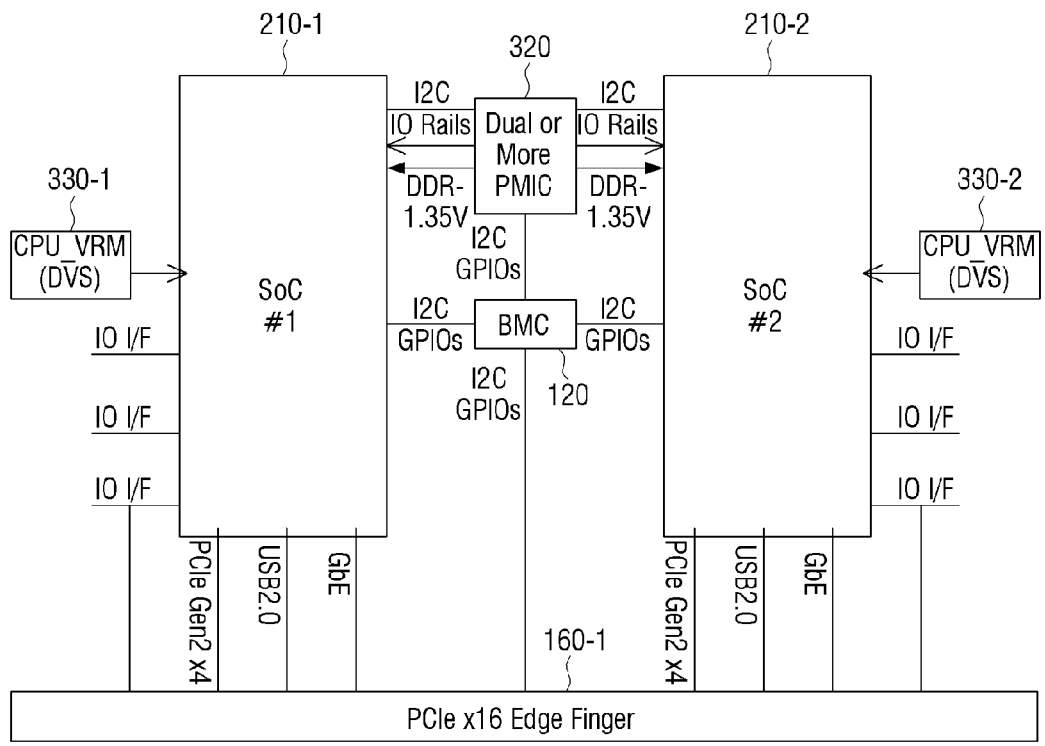
FIG. 3 is a view illustrating functions of a PMIC of a micro server according to an exemplary embodiment of the present disclosure.

FIG. 3 is a view illustrating functions of a PMIC 320 according to an exemplary embodiment of the present general inventive concept. FIG. 3 illustrates a case where the PMIC 320 does not perform a CPU-voltage regulator module (CPU_VRM) function with a distributed virtual switch (DVS).

With reference to FIG. 3, the micro server 100 may include a plurality of SoC 210 (210-1, 210-2), the PMIC 320, a plurality of transformers 330 (330-1, 330-2), and the module manager 120.

The SoC 210 is a CPU disposed on the processor module 200. It may be an INTEL based CPU, an ARM based CPU, or an ARM type CPU. The first SoC 210-1 and the second SoC 210-2 may be a same type of a CPU, or different types of CPUs.

The SoC 210 is a CPU disposed on the aforementioned processor module 200, and the Intel® based SoC 210 transceives core information and IO state information to the PMIC 320 and I²C (or I2C). In addition, the SoC 210 transceives a required voltage change command to the transformer 330 using an I/O (IO) interface.

In addition, the SoC 210 is supplied with power through the plurality of rails (IO rails) of the PMIC 320. However, a voltage may be supplied to a core inside the SoC 210 through the transformer 330.

The PMIC 320 may transceive various information to each SoC 210-1, 210-2 and I2C, and supply power to the plurality of rails according to the information. In the illustrated example, the PMIC 320 supplies power to two SoC 210, and thus is provided with a plurality of pairs of rails to output different powers, for example, difference voltages. Configurations and operations of the PMIC 320 will be explained hereinafter with reference to FIGS. 5 and 6.

Meanwhile, the PMIC 320 is provided with a multiplexer (MUX), and the PMIC 320 may perform communication with the plurality of SoCs 210 (210-1, 210-2) by expanding the I²C using the provided MUX.

The transformer 330 provides variable voltages to the core inside the SoC 210. The transformer 330 is notified with a voltage value that may satisfy a CPU frequency and load conditions from the SoC 210, and then provides the notified voltage value to the SoC 210.

The module manager 120 is connected to the SoC 210 directly by the I²C and the PMIC 320 directly by the I²C. Accordingly, the module manager 120 receives information such as core clock information and state IO information (for example, a current value per rail, a power state, a voltage value setting, etc.) for direct power management from the PMIC 320.

The module manager 120 may communicate with the PMIC 320, the Soc 210, and the interface bus 160-1 through I2C (GPIOs). The SoC 210 may communicate with the interface bus 160-01 through signal lines GbE, USB 2.0, and/or PCIe Gen 2×4. It is possible that the PMIC may supply to the SoC 210 with a power of DDR-1.35V, for example.

Figure 4:
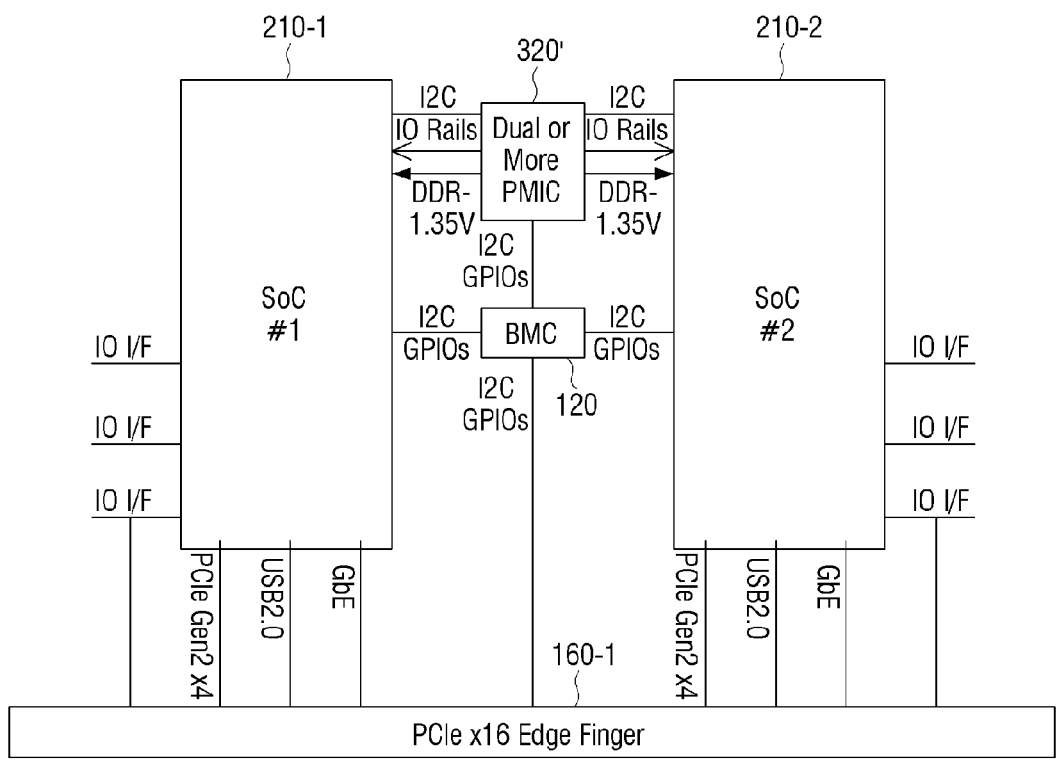
FIG. 4 is a view illustrating functions of a PMIC of a micro server according to an exemplary embodiment of the present general inventive concept.

FIG. 4 is a view illustrating functions of a PMIC 320' according to an exemplary embodiment of the present general inventive concept. FIG. 4 illustrates a case where it is possible to perform a CPU_VRM function in the PMIC 320'.

With reference to FIG. 4, the micro server 100 may include a plurality of SoC 210 (210-1, 210-2), the PMIC 320', and the module manager 120.

The SoC 210 is a CPU where the aforementioned processor module is disposed. The SoC 210 may be an INTEL based CPU, an ARM based CPU, an ARM type CPU, etc. In the illustrated example, the first SoC 210-1 and the second SoC 210-2 may be a same type of a CPU, or different types of CPUs.

The SoC 210 transceives core information and IO state information to the PMIC 320' and I²C, and transmits a size of voltage necessary in the core to the PMIC 320'.

Then, the SoC 210 is supplied with power through a plurality of rails of the PMIC 320'.

The PMIC 320' may transceive various information to each of SOC 210 (210-1 and 210-2) and I²C, and supply power to the plurality of rails. In the illustrated example, the PMIC 320 supplies power to two SoCs 210 (210 and 210-2), and thus it is provided with a plurality of pairs of rails. The configuration and operations of the PMIC 320' are explained hereinbelow with reference to FIGS. 5 and 6.

In addition, the PMIC 320' may provide variable voltage to the core inside the SoC 210. The PMIC 320' is notified with a power, for example, a voltage value, that satisfies a CPU frequency and load conditions from the SoC 210, and then provides the notified voltage value to the SoC 210.

Meanwhile, the PMIC 320 is provided with a multiplexer (MUX), and the PMIC 320 may perform communication with a plurality of SoCs 210 (210-1 and 210-2) by expanding the I²C using the MUX provided.

The module manager 120 is connected to the SoC 210 directly by I2C and/or the PMIC 320 directly by I²C. Accordingly, the module manager 120 receives information such as core clock information and state IO information (for example, a current value per rail, a power state, a voltage value setting, etc.) for direct power management from the PMIC 320.

Figure 5:
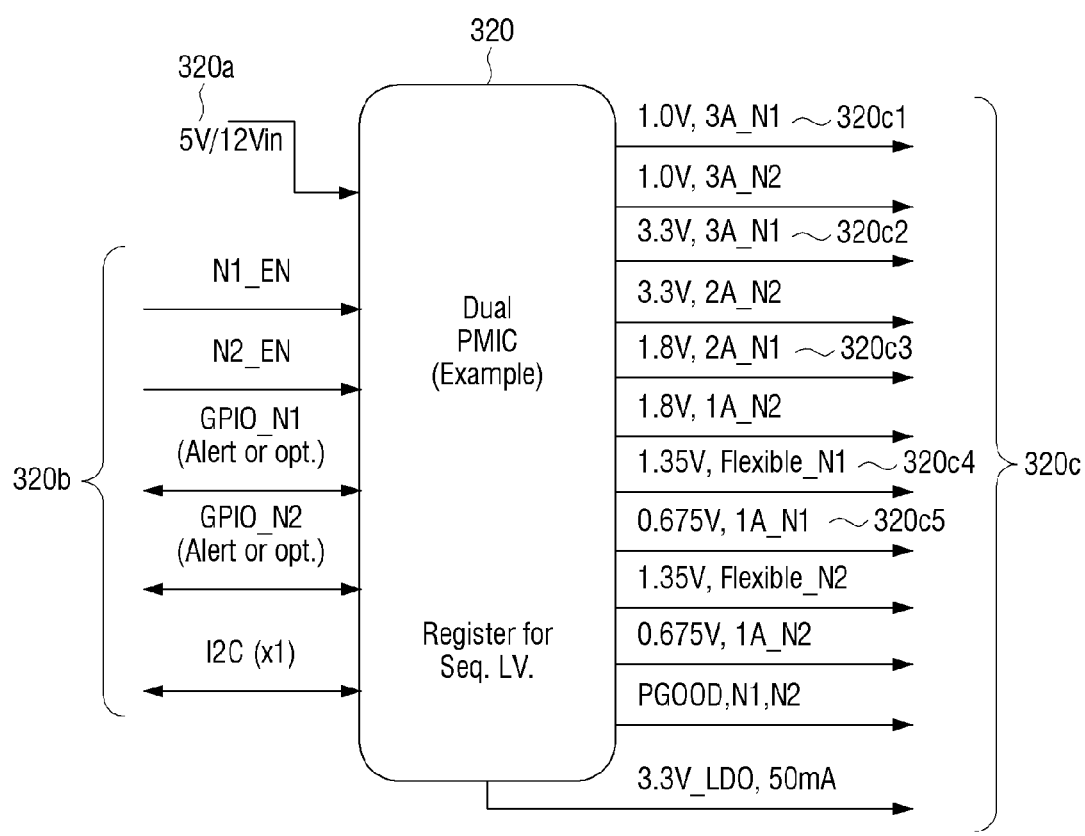
FIGS. 5 and 6 are block diagrams illustrating a specific configuration of a PMIC of FIG. 3.
Figure 6:
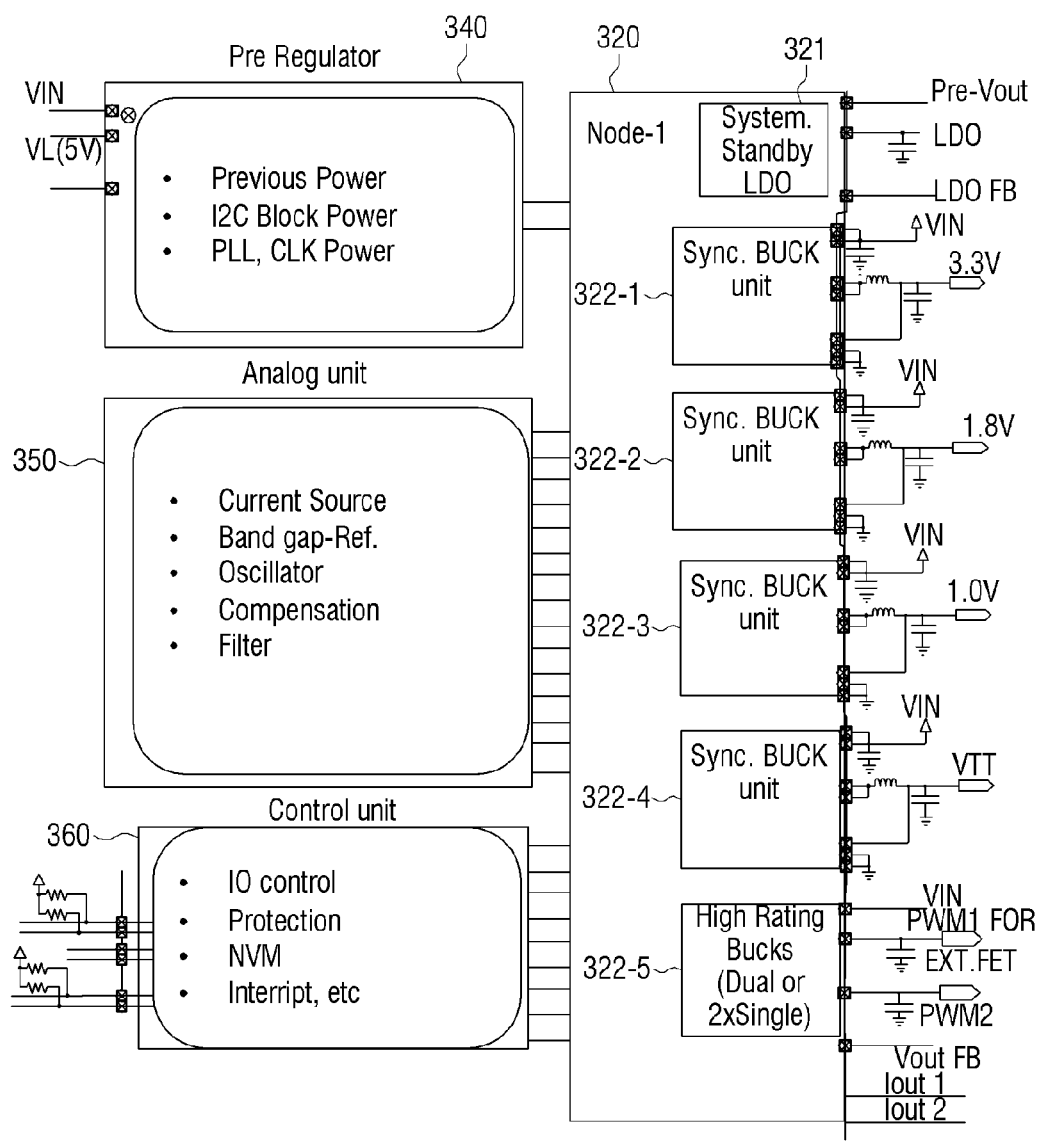

FIGS. 5 and 6 are block diagrams illustrating an overall configuration of the PMIC 320 of FIG. 3 according to an embodiment of the present general inventive concept.

With reference to FIG. 5, the PMIC 320 is provided with an input power Vin 320a of 5V to 12V, generates an enable signal to enable N1_EN, N2_EN, GPIO, I²C, etc., and provides a plurality of rails 320c of different sizes to each of the two SoCs. Herein, the plurality of rails 320c may be a first rail 320c1 to output a first power of 1V and 3 A, a second rail 320c2 to output a second power of 3.3V and 3 A, a third rail 320c3 to output a third power of 1.8V and 2 A, a fourth rail 320c4 to output a fourth power of 1.35 V, and a fifth rail 320c5 to output a fifth power of 0.675V and 1 A, for example.

The PMIC 320 may include one or more registers for a sequential LV associated with at least one of the rails 320c. The rails 320c may be referred to as a power (or signal) line or may be referred to a power to be transmitted therethrough.

Although FIG. 5 illustrated a number of rails, the present general inventive concept is not limited thereto. The PMIC 320 may have a different number of rails or different powers sufficiently to supply the corresponding power to the different process modules so that when a new process module is connected to the micro server 100, the new process module can receive a necessary power from the PMIC 320 without replacing the PMIC 320 with a new PMIC or without a significant change to the PMIC 320.

With reference to FIG. 6, when input power Vin and/or VL is ready, and an enable signal is received through a GPIO or I²C, various power of PMIC 320 is supplied per function block, and a pre-regulator 340 that provides power such as a power to operate corresponding ones of an initial I²C interface, a PLL, and a clock CLK.

In addition, an analogue unit 350 may operate in a bandgap reference (Band gap-Ref.) used as a certain voltage control reference for temperature, and include a compensator for gain compensation/phase compensation of an error AMP and blocks for supplying current source inside the PMIC 320, a filter, an oscillator, etc., to operate accordingly.

In addition, when the pre-regulator 340 is turn-on, a control unit 360 performs functions, for example, an IO control function, a report function, an NVM (Non-volatile memory), an interrupt processing, etc., operates accordingly to perform the functions of the control unit 360. The pre-regulator 340, the analog unit 350, and the control unit 360 may correspond to components of the power supply device 300 to control the PMIC 320 and/or supply a power to the PMIC 320 according to corresponding information and signals thereof.

When all control circuit blocks and reference power sources are prepared and then initially set up, or when a sequence is set up through an I²C block which revives during enabling, the PMIC 320 including a virtual receiver (VR or system standby LDO) 321 and each converter 322 (322-1, 322-2, 322-3, 322-4, and 322-5) may start up in a sequential order.

Herein, the converter 322 may include a synchronous buck. Such a converter 322 may not output a voltage/current when power is not being supplied. In addition, when a size of a connected load of the module 200 or the SoC 210 is reduced, the converter 322 may reduce the size of the output voltage by a predetermined size and output the reduced voltage. This will be explained in more detail with reference to FIGS. 9 and 10.

Herein, the synchronous buck is a basic DC-DC topology having an increased efficiency of a DC-DC converter by switching one or more FETs of high/low sides alternatively.

Figure 7:
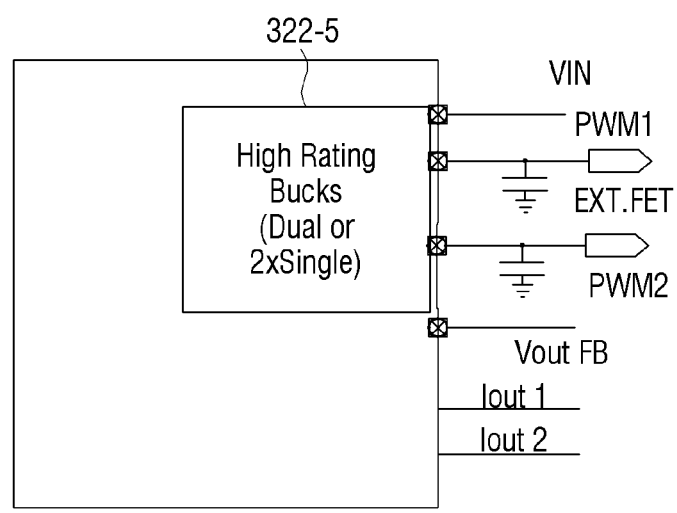
FIG. 7 is a block diagram illustrating an overall configuration of a high current outputter according to a first exemplary embodiment of the present general inventive concept.
Figure 8:
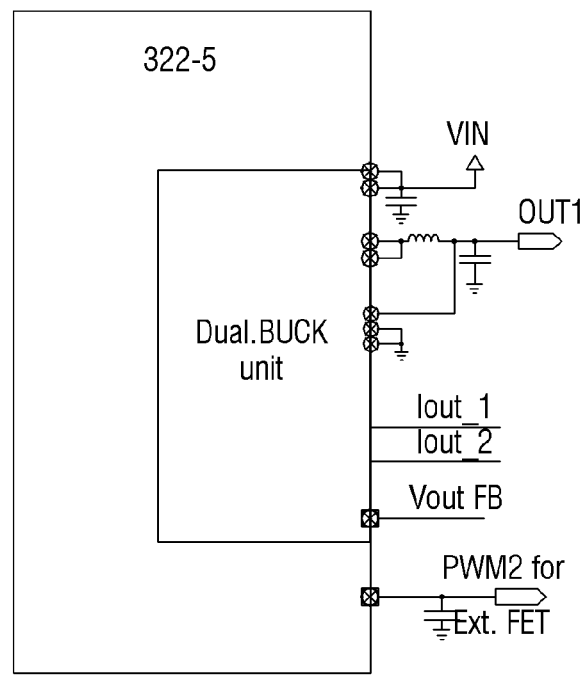
FIG. 8 is a block diagram illustrating a specific configuration of a high current outputter according to a first exemplary embodiment of the present general inventive concept.

Meanwhile, when a rail of a high current is needed, it may include a high rating buck 322-5 as illustrated in FIGS. 7 and 8. The PMIC 320 may have a PWM controller, and it is possible to configure a switching device (DrMOS, External Driving FET, etc.) outside the PMIC 320 such that a necessary current corresponding to a required capacity or the connected load may be output flexibly according to the power source device 300.

FIG. 7 is a block diagram illustrating an overall configuration of a high current outputter as the converter 322-5 of FIG. 6 according to an exemplary embodiment of the present general inventive concept.

With reference to FIG. 7, the PMIC 320 may include a plurality of pulse width modulators (PWMs) or PWM signal generator that switches a switching device outside the PMIC. The PWM signal PWM1 or PWM2 that is output from each PWM may have a same phase difference (no phase difference) for interleaving.

The PMIC 320 may receive signals of Vout FB, Lout 1 and Lout 2 to correct the PWM signal. An output of the switching device may be combined with an output of synchronous buck to output a power supplied to the process module or SoC through at least one of the rails.

When the necessary current is too high to be provided in a 1 phase, it is possible to generate a PWM signal having a phase difference of 180' so as to reduce ripple through the interleaving by 2 phases, and it is possible to receive a feedback Vout FB of the current and output of each phase, and enable each PWM signal generator to generate a control signal for 1 and 2 phase switching On/Off. Herein, interleaving is a DC-DC topology designed to reduce the ripple as each phase switches alternately by a phase of 360'/N in the converter having N phases.

FIG. 8 is a block diagram illustrating a configuration of a high current outputter as the converter 322-5 of FIG. 6 according to an exemplary embodiment of the present general inventive concept.

With reference to FIG. 8, the PMIC 320 may include a PWM generator for switching a switching device outside the PMIC 320, and the PMIC 320 combines an output of the switching device by the PWM signal and an output of a synchronous buck in one, and outputs the result.

It is possible to generate a desired power by an in-phase operation of the 2 phase through one embedded sync-buck and one PWM controller. However, since the phase impedances are different, in order to perform a smooth interleaving by out of phase of a phase difference of 180', it is necessary to make a current balancing to avoid a reverse current on a top portion thereof, which requires precise current control.

Figure 9:
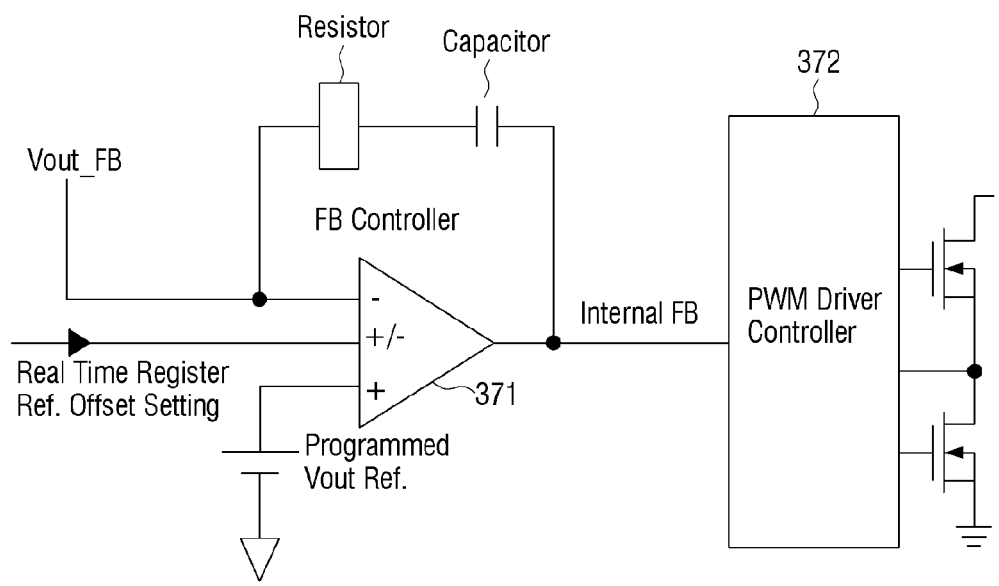
FIG. 9 is a view illustrating a reference diagram for embodying a DVS of FIG. 6.
Figure 9:
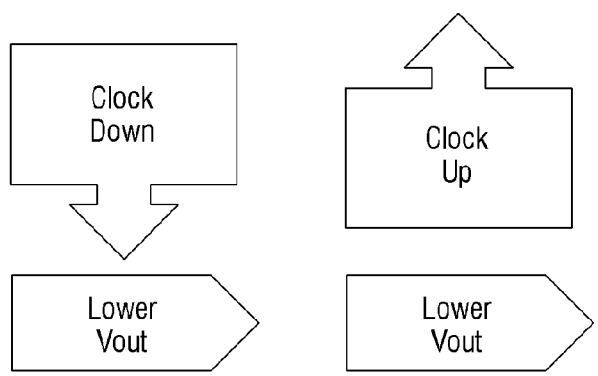

FIG. 9 is a diagram illustrating a distributed virtual switch DVS of a CPU-voltage regulator module (CPU_VRM) function which may be included in a PMIC illustrated in FIG. 3 or 6.

With reference to FIG. 9, the PMIC may include an error amp or comparator 371 as a feedback (FB) controller to receive inputs, for example, a feedback signal Vout-FB, a signal corresponding to a real time register reference, and a programmed output voltage reference (or preprogrammed basic voltage reference value), and to output a signal as an internal feedback signal (FB) to a PWM driver controller 372. In order to realize a power DVS per lain, a converter may set an output voltage to a low predetermined value when a clock signal is low, and set the output voltage high to a high predetermined value when the clock is high. When a controller generates an input error for generating a PWM, clock information is received as a preprogrammed basic voltage reference value through a BMC or a PMIC, and the PMIC performs real time offset setting of an offset value proportionate to the clock signal through a register (not illustrated). Accordingly, an offset voltage smaller than a value of the output voltage that is feedback through the error amp or comparator 371 is output to a PWM driver controller 372.

Figure 10:
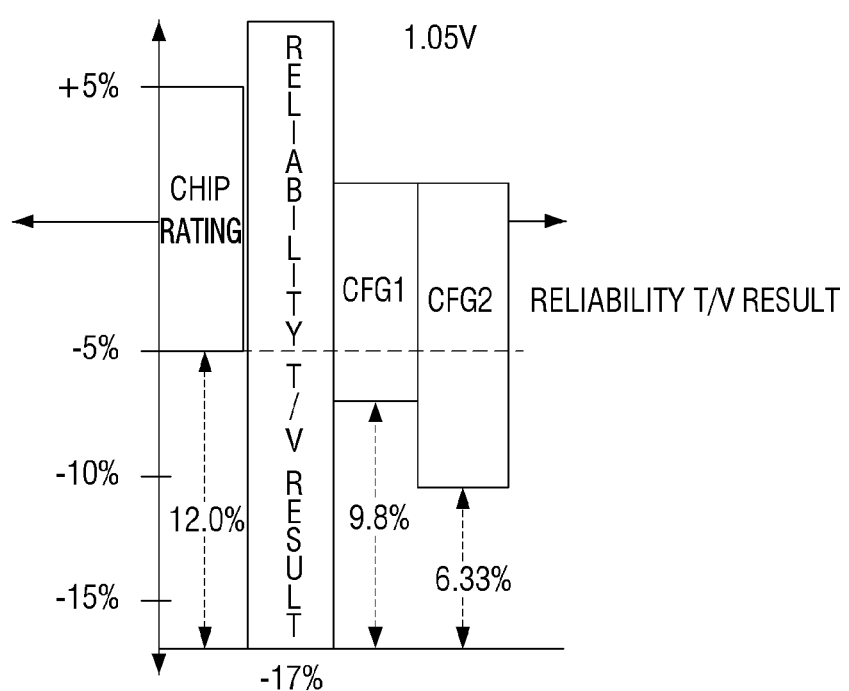
FIG. 10 is a view illustrating a reference diagram for embodying an LV.

FIG. 10 is a diagram illustrating an LV.

With reference to FIG. 10, there is provided an NVM storage device having an offset value program to design or determine a value inside the predefined PMIC. It may be embodied in a format where an SoC or a BMC may write (or generate) an offset value proportionate to the clock signal in the register.

In a low frequency mode LFM, it is possible to give a maximum offset to create a minimum output value, and in a high frequency mode HFM, it is possible to set the offset value to 0 so that an original output size can be generated, and in a middle frequency area, it is possible to set a ½ offset, etc. Meanwhile, it is possible to divide the adjusting of a voltage offset in clock operation ranges. For example, if there are many steps of an operational speed, it is possible to change the offset linearly according to each operation step. If an I/F speed with the SoC and BMC of the PMIC is slow, or it is difficult to secure stability of a PMIC controller, it is possible to design the device so that it operates in two modes: LFM, HFM.

An offset voltage should be designed considering the subordinate voltage margin up to 5%~10% of a margin for which a temperature and a voltage have been verified. For example, if the TN margin test result is −17%, the range of the offset voltage may be lowered to −12%~−7%.

As such, the according to the present exemplary embodiment, one PMIC supplies power to the plurality of SoCs, and thus it is possible to design the power device of the CPU in a maximum area which becomes the basis for creating a highly integrated and low power system, and to supply power of two or more SoCs with one PMIC, thereby operating bias power efficiently and realizing low power. Furthermore, it is possible to reduce power consumption since it is possible to reduce the size of the output voltage in the section where the size of the load is not high.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply device comprising:
   a power supply configured to supply DC power; and
   a power management integrated circuit (PMIC) configured to convert DC power provided from the power supply and to provide the converted DC power to a system on chip (SoC),
   wherein the PMIC is provided with a plurality of rails configured to output different voltages,
   wherein:
   the PMIC comprises a plurality of PWM generators configured to output a PWM signal for switching a switching device outside the PMIC; and
   the plurality of PWM generators are configured to output a plurality of PWM signals having a same phase difference.

2. A power supply device comprising:
   a power supply configured to supply DC power; and
   a power management integrated circuit (PMIC) configured to convert DC power provided from the power supply and to provide the converted DC power to a system on chip (SoC),
   wherein the PMIC is provided with a plurality of rails configured to output different voltages,
   wherein:
   the PMIC comprises a PWM generator configured to output a PWM signal for switching a switching device outside the PMIC; and
   a rail of the plurality of rails is a combination of an output of synchronous buck and an output of a switching device by the output PWM signal.

3. The power supply device of claim 2, wherein the rail reduces a size of an output voltage by a predetermined size and outputs the reduced output voltage when a size of a connected load is reduced.

4. The power supply device of claim 1, wherein the PMIC transceives core information and IO state information with the SoC using an inter-integrated circuit.

5. The power supply device of claim 4, wherein the PMIC transceives the core information and IO state information corresponding to the SoC and a baseboard management controller (BMC).

6. The power supply device of claim 4, wherein the PMIC comprises a multiplexer and performs communication of the inter-integrated circuit with a plurality of SoC using the multiplexer.

7. The power supply device of claim 1, wherein:
the SoC comprises a plurality of SoCs; and
the PMIC simultaneously supplies the power to the plurality of SoCs.

8. The power supply device of claim 1, wherein the plurality of rails comprise a first rail to output a first power of 1V and 3 A, a second rail to output a second power of a 3.3V and 3 A, a third rail to output a third power of 1.8V and 2 A, a fourth rail to output a fourth power of 1.35V, and a fifth rail to output a fifth power of 0.675V and 1 A.

9. A micro server comprising:
a plurality of system on chip (SoC);
a power supply supplying DC power; and
a power management integrated circuit (PMIC) configured to convert DC power provided from the power supply and to provide the converted DC power to the plurality of SoCs,
wherein the PMIC is provided with a plurality of rails to output different voltages,
wherein:
the PMIC comprises a plurality of PWM generators to output a PWM signal for switching a switching device outside the PMIC: and
the plurality of PWM generators are configured to output a plurality of PWM signals having a same phase difference.

10. A micro server comprising:
a plurality of system on chip (SoC);
a power supply supplying DC power; and
a power management integrated circuit (PMIC) configured to convert DC power provided from the power supply and to provide the converted DC power to the plurality of SoCs,
wherein the PMIC is provided with a plurality of rails to output different voltages,
wherein:
the PMIC comprises a PWM generator configured to output a PWM signal for switching a switching device outside the PMIC; and
a rail of the plurality of rails is a combination of an output of synchronous buck and an output of a switching device by the output PWM signal.

11. The micro server of claim 10, wherein the rail reduces a size of an output voltage by a predetermined size and outputs the reduced output voltage when a size of a connected load is reduced.

12. The micro server of claim 9, further comprising:
a module manager configured to notify a state of the micro server to an external manager server,
wherein the PMIC transceives core information and IO state information to the module manager using an inter-integrated circuit.

13. The micro server of claim 9, wherein the PMIC simultaneously supplies the power to a plurality of SoCs.

* * * * *